United States Patent
Liao et al.

(10) Patent No.: US 7,492,714 B1
(45) Date of Patent: Feb. 17, 2009

(54) METHOD AND APPARATUS FOR PACKET GROOMING AND AGGREGATION

(75) Inventors: Heng Liao, Belcarra (CA); Stacy Nichols, Kanata (CA); Vernon R Little, White Rock (CA); Kevin Huscroft, Port Moody (CA)

(73) Assignee: PMC-SIERRA, Inc., Santa Clara, CA (US)

( * ) Notice: Subject to any disclaimer, the term of this patent is extended or adjusted under 35 U.S.C. 154(b) by 854 days.

(21) Appl. No.: 10/771,268

(22) Filed: Feb. 3, 2004

Related U.S. Application Data

(60) Provisional application No. 60/444,649, filed on Feb. 4, 2003.

(51) Int. Cl.
*G01R 31/08* (2006.01)
*H04L 12/28* (2006.01)

(52) U.S. Cl. ................................. 370/235; 370/395.32
(58) Field of Classification Search ................. 370/401, 370/466
See application file for complete search history.

(56) References Cited

U.S. PATENT DOCUMENTS

| | | | |
|---|---|---|---|
| 6,014,708 A | 1/2000 | Klish | |
| 6,122,281 A | 9/2000 | Donovan et al. | |
| 6,222,848 B1 * | 4/2001 | Hayward et al. | 370/412 |
| 6,414,966 B1 | 7/2002 | Kulkarni et al. | |
| 6,496,519 B1 * | 12/2002 | Russell et al. | 370/465 |
| 6,678,474 B1 * | 1/2004 | Masuda et al. | 398/75 |
| 6,788,658 B1 * | 9/2004 | Bims | 370/328 |
| 6,909,720 B1 * | 6/2005 | Willis | 370/395.52 |
| 2001/0040896 A1 * | 11/2001 | Frouin et al. | 370/466 |
| 2002/0191543 A1 * | 12/2002 | Buskirk et al. | 370/230.1 |
| 2004/0017796 A1 * | 1/2004 | Lemieux et al. | 370/349 |
| 2004/0034759 A1 * | 2/2004 | Katzman et al. | 712/1 |
| 2004/0156313 A1 * | 8/2004 | Hofmeister et al. | 370/229 |
| 2004/0258062 A1 * | 12/2004 | Narvaez | 370/389 |
| 2005/0021807 A1 * | 1/2005 | Van Eijndhoven et al. | 709/231 |
| 2005/0025469 A1 * | 2/2005 | Geer et al. | 386/125 |
| 2006/0126644 A1 * | 6/2006 | Akahane et al. | 370/395.53 |
| 2006/0133411 A1 * | 6/2006 | Denton et al. | 370/463 |

FOREIGN PATENT DOCUMENTS

EP     1006751 A2     6/2000

* cited by examiner

*Primary Examiner*—Kwang B Yao
*Assistant Examiner*—Tung Q Tran
(74) *Attorney, Agent, or Firm*—Mukundan Chakrapani; Borden Ladner Gervals LLP

(57) ABSTRACT

A method and apparatus for building a packet grooming and aggregation engine is disclosed. The grooming and aggregation engine can be applied to the network for providing flexible aggregation and service multiplexing functions. A method and apparatus achieves the intended function that is easy to implement and easy for the network operator to manage, yet provides enough flexibility to mix and match various services at the edge node of the network. One specific embodiment of the patent is an Ethernet over SONET mapping system where user traffic is aggregated and groomed into SONET transport virtual concatenation channels.

3 Claims, 13 Drawing Sheets

Figure 1: Ethernet over SONET

METHOD AND APPARATUS FOR PACKET GROOMING AND AGGREGATION

RELATED APPLICATIONS

The present application claims priority from U.S. Provisional Patent Application Ser. No. 60/444,649 filed on Feb. 4, 2003.

BACKGROUND OF THE INVENTION

1. Field of the Invention

The present invention relates to communications network equipment design, including Multi-Service Provisioning Platform (MSPP) systems with Ethernet over SONET functions. More specifically, the present invention provides a simple, efficient, and scalable method for building an Aggregation/Grooming Engine (AGE) for processing packet flows. Further, the present invention involves an Ethernet over SONET system that employs the AGE technique.

2. Description of the Prior Art

In the field of communications, SONET and SDH are a set of related standards for synchronous data transmission over fiber optic networks. SONET is short for Synchronous Optical NETwork and SDH is an acronym for Synchronous Digital Hierarchy. SONET is the United States version of the standard published by the American National Standards Institute (ANSI). SDH is the international version of the standard published by the International Telecommunications Union (ITU).

Ethernet over SONET/SDH (EOS) technology came about in the recent years as a popular way of adding new data services such as Ethernet data transport SONET/SDH network that is originally designed to carry TDM (time division multiplexing) services such as telephone services. Ethernet being the ubiquitous interface in the Enterprise network is regarded as the most convenient customer interface for delivering data service. SONET/SDH is the most broadly deployed technology in the WAN or MAN infrastructures all over the world. Ethernet Over SONET is a powerful combination that takes advantage of the existing network infrastructure and the broad user base of Ethernet as a data communication technology.

Typically, the adaptation function to mapping Ethernet frames into a SONET/SDH bit stream is carried out at the edge of the network in a category of network equipment called Multi-Service Provisioning Platform (MSPP) device. The MSPP typically has at least two types of the interfaces: SONET/SDH interfaces, and Ethernet interfaces. The SONET/SDH line and tributary interfaces provide connection to the MAN or WAN SONET/SDH rings or TDM services nodes. The Ethernet ports are either connected to customers directly or L2/L3 data switches for implementing L2/L3 data switch-overlay network. In the overlay network, the SONET network with MSPP devices at the edge provides physical layer transport among the L2/L3 switches. The physical realization of the transport network is therefore invisible to the switches as they regard the transport as a virtual point-to-point media. In this overlay network model, the complexity of the SONET/SDH transport network is isolated from the complexity of the L2/L3 switching/routing network. The different network functions at different layers can be realized in different network equipment and are managed separately.

The basic concept of Ethernet over SONET network is shown in prior art FIG. 1. There are a number of ways of implementing Ethernet over SONET services within the MSPP devices with the assist of external L2/L3 switches. Independent of the processing function at the EOS adaptation layer and above, the primary characteristics of EOS technology remains unchanged. That is to use Ethernet as the data service user network interface and network-to-network interface, and to use SONET/SDH as the underlying transport layer. As in any other data service network, the concept of grooming and aggregation is applicable to a multi-service network based on SONET/SDH and EOS technologies. For purposes of the present discussion, the focus is with the grooming and aggregation issues in multi-service networks.

There are a number of ways of implementing Ethernet over SONET function in the MSPP nodes. Most implementations utilize a number of emerging networking standards including: ITU-T G.7041, Generic Framing Procedure (GFP); ITU-T G.7042, Link capacity adjustment scheme (LCAS) for virtual concatenated signals; ITU-T G.707, "Network Node Interface for the Synchronous Digital Hierarchy", Helsinki, March 1996; T1X1.5/2000-192, Supplement to T1.105.02-2000, "SONET Payload Mappings (inclusion of Virtual Concatenation)", 2000; T1X1.5/2000-193, Supplement to T1.105-2000, "SONET Basic Description including Multiplex Structure Rates and Formats (inclusion of Virtual Concatenation)", 2000; IETF RFC 1661, the Point to Point Protocol; ITU-T X.85 IP over SDH using LAPS; and ITU-T X.86, Ethernet over SDH using LAPS. These standard protocols provide the basic building blocks for implementing EOS systems.

The Virtual Concatenation protocol provides ways of concatenating a number of SONET/SDH time slots to form transport pipes of flexible bandwidth. Virtual concatenation can be done both at STS/STM level (High Order), or Virtual Tributary Level (Low Order). The High Order Virtual Concatenation mapping and Low Order Virtual Concatenation mapping provides virtual concatenation function at different bandwidth granularities.

LCAS provides a mechanism for dynamically adjusting the size of a Virtually Concatenated channel (virtual concatenation group). This allows TDM services to be more flexibility for handling dynamic bandwidth demands. LCAS relies on the network NMS/EMS to provision the bandwidth change. LCAS protocol coordinates the operations of the two end points of the Virtual concatenation group to ensure the channel size adjustment to be hitless.

GFP, X.85, X.86, and PPP are various ways of adapting and mapping Ethernet frames (packets) to SONET/SDH bit stream. For example, GFP defines a generic framing procedure to encapsulate variable length payload of various client signals for subsequent transport over SDH and OTN networks as defined in ITU-T G.707 and G.709. The details about encapsulation, frame delineation, and communicating mechanism for control-information differ from one protocol to the other. However, the basic adaptation function between Ethernet frames and SONET/SDH transport format is common.

These well-known protocols provide the basis for most, if not all, Ethernet over SONET/SDH implementation. The current EOS systems can be broadly divided into the two categories, which are considered as the prior art references: Layer 1 (L1) EOS transport systems and Layer 2/3 (L2/3) EOS switch systems.

The L1 EOS transport systems endeavour to provide point-to-point Ethernet private line services over SONET/SDH transport infrastructure. These systems use Ethernet ports as the private line demarcation point between the client and the network. In other words, the hand off point between the network and the client and the service level agreement is defined over the Ethernet media between a client device and the Ethernet port service provider MSPP device. To provide an EOS private line between two points (A and B) in the network would required MSPP devices at both end points: MSPP_A and MSPP_B. MSPP_A would accept the client Ethernet data flow over the assigned Ethernet port on MSPP_A for this client, and adapt the Ethernet flows (frames) into SONET/SDH Virtual concatenation or contiguous concatenation group. The SONET/SDH transport network will deliver the constituent time slots (channels) of the concatenation group over common or diverse paths to end point B. The MSPP device at point B would take the constituent channels (paths) and do the merging, alignment, and reverse mapping from the SONET/SDH data format to recover the Ethernet frame format. By configuring the number of time slots to the concatenation group, the service provider can control the transport bandwidth of the EOS private line.

FIG. 2 shows the block diagram of a prior art device that implements a typical L1 Ethernet over SONET Transport System in a single IC device. Such device provides mapping function from Gigabit Ethernet ports to SONET virtual concatenation groups using GFP, X.86, and SONET virtual concatenation technologies. The system can be conceptually divided into the following functional blocks:

a. Ethernet MAC and buffer (implements 802.3 function)
 b. Frame Encapsulation/Decapsulation Engine (implements GFP, X.86 etc)
 c. Transmit/Receive Virtual Concatenation Processor (implements SONET/SDH Virtual Concatenation and Contiguous Concatenation mapping function)
 d. SONET protocol processor (provides the interface to SONET/SDH network)

The L1 Ethernet over SONET Transport Systems are well suited for provided point to point Ethernet private line service between two client sites. However, this technique becomes inefficient when a common network node need to deal with many leased lines (point to multi-point applications). One example of such a scenario is an enterprise headquarters' need to have a number of leased lines to the many branch offices. Another example is a service provider point of presence (POP) needing to deal with many customer traffic flows carried by individual leased lines from different customer sites. The inefficiency arises as the L1 Ethernet over SONET Transport Systems can only deal with a single client EOS data flow on each Ethernet physical interface. In the case of the service provider POP that has N client flows to deal with, the MSPP device facing the POP has to assign as many (N) Ethernet over SONET ports of the MSPP as there are number of customer flows. Also, the N client flows will consume N ports on the POP equipment (switch or router) as these flows are delivered over individual Ethernet physical ports. The drawbacks of this approach for point to multi-point applications include:

a. Poor scalability: The number of flows that an MSPP or POP switch can service is limited by the number of physical Ethernet interfaces.
 b. Poor bandwidth efficiency: The EOS private line client flows have much lower rate than the physical port bandwidth. When each flow is delivered using a physical Ethernet port, the port bandwidth is underutilized.
 c. High equipment cost: The low efficiency of the ports on MSPP and switches means to service the same total traffic load, the number of ports on equipment need to be higher. This results in higher total equipment cost.
 d. Inflexibility and higher maintenance cost: Each client flow requires one physical cabling between the MSPP device and the adjacent switch/router.

It is possible to provide a more "efficient" solution by performing switching at L2 or L3 to aggregate and/or locally switch traffic. The L2/L3 Ethernet over SONET/SDH Switch systems combines the function of Ethernet over SONET mapping and L2/L3 Ethernet switching into the MSPP system. FIG. 3 shows a prior art L2/L3 Ethernet over SONET/SDH Switch System Block Diagram. The system contains the functional blocks for a L1 EOS system such as Ethernet MAC, encapsulation, Virtual concatenation processing, and SONET/SDH overhead termination required. Additionally, the L2/L3 EOS system also includes Ethernet L2/L3 switching function. The L2/l3 EOS system combines the function of traditional SONET/SDH transport system and L2/L3 Ethernet switch or IP router function into a common hardware platform. The L2/L3 EOS systems can be used to build an overlay L2/L3 network on top of SONET/SDH network as shown in FIG. 4.

Substantial hardware saving may be achieved because the single EOS system can deliver the function of two types of traditional hardware systems. However, adding L2/L3 switching function into a MSPP system has a large impact on the architecture of the MSPP system and the design of the overall network. In order to provide the traditional L2/L3 switching/routing function, the MSPP now have to incorporate the L2 and L3 control plane function, namely the 802.1D bridging protocols and the routing protocols such as OSPF and BGP. This adds significant complexity to the MSPP system. Also, adding complete L2/L3 switch functions to the MSPP would required the MSPP system to incorporate a packet switch fabric in additional to the TDM switching fabric. That adds a large cost burden on the MSPP hardware.

Often, an MSPP system designer chooses to implement the L2/L3 switching function on the EOS data line-card to avoid the cost burden of the additional full-scale packet switch fabric or a combined switch fabric that can deal with both TDM cross-connect function as well as packet switching function. The consequence is MSPP systems logically become a distributed L2/L3 switch connected by TDM fabric. Each line-card have to be treated as an independent switch associated with its own bridging and routing protocol instantiation. Also, the switching function is limited to be among the ports on the line-card instead of providing full local switching capability among all the ports on the MSPP system. These limitations further complicate system and network design and network administration overhead.

When the MSPP devices are running L2/L3 bridging protocols, there is an issue of interaction between the MSPP bridges/routers interact with the client switches/routers. For example, the MSPP 802.1D protocol engine automatically learns the MAC addresses and topology in the client's enterprise network and makes forwarding decisions according to the spanning tree and forwarding database. This may cause complex network management, security, and scalability issues, as the service provider equipment is now participating in the bridging/routing domain of the Enterprise network. These issues are undesirable either from the Enterprise network administration perspective or from the service provider's perspective as neither group has full control over the network devices involved.

Another challenge of L2/L3 EOS systems is in network deployment difficulties. The bridging/routing protocols running on the L2/L3 EOS systems need to communicate with equal peer nodes to exchange bridging and routing information. For example, to deploy an overlay L2 network requires all the L2 edge nodes on the overlay network to have the same L2 capabilities to allow 802.1D protocol to function properly. That forces all MSPP nodes in the network to adopt the L2/L3

EOS system. This forklift deployment approach may be suitable for new network deployment, but is very costly for incremental network upgrades. The L2/L3 EOS system nodes cannot inter-operate with L1 EOS system nodes because the L1 nodes lack the capability of L2/L3 bridging/routing protocols.

Yet another challenge in L2/L3 EOS system is the difficulty in providing Quality of Service (QOS) guarantees for the data services at L2 and L3. Many of the business data services are connection oriented (private line like). These flow-based services require the service provider to guarantee the service qualities as specified in Service Level Agreements (SLA). The SLA often specifies traffic profile characteristics such as minimal bandwidth, maximum delay, packet loss ratio, etc. The L1 EOS technology can deliver QOS characteristics relatively easily by provisioning SONET/SDH transport bandwidth to according to the SLA. Due to the connectionless nature of Ethernet and IP protocols, it is much more difficult to provide the same QOS guarantees at Ethernet or IP layer. Although technologies such as MPLS, Diffserv, IntServ, and 802.1p have been introduced to improve the L2/L3 QOS. The cost and complexity of implementing such higher layer QOS capabilities is often higher than L1 EOS systems. Accordingly, while an L1 architecture does not invalidate L2/L3 service models, it is not clear that the transport providers will benefit from implementing L2/L3 service models that comes with full-up L2/L3 "layering".

What is needed therefore is a flexible and efficient mapping procedure capable of mapping between Ethernet frame formats and SONET transport channels.

SUMMARY OF THE INVENTION

The present invention provides Current EOS systems that are capable of doing mapping between Ethernet frame formats and SONET transport channels (virtual concatenation groups). The current EOS approaches lack flexibility in the mapping procedure.

Grooming and aggregation are two common functions required in a public multi-service network. Often the multi-service network can be partition into transport layer and the data service layer. The transport layer offers point-to-point transport function of fixed bandwidth pipes. The data service layer implements the high layer protocol functions for packet switching and routing as well other value-add higher layer data services.

The transport network is often required to transport multiple client packet flows (typically from multiple end points of the network, representing multiple customers) over a shared transport connection in order to improve the bandwidth efficiency of the transport network. The function of merging and mapping multiple service flow into a single transport connection is called packet flow aggregation.

Conversely, there is the need for delivering multiple transport connections to a common end point. The function of multiplexing the data flows from several transport connections over a common physical connection to the common destination is called packet flow grooming. The flow aggregation aims to deliver efficient BW use within a flow due to statistical multiplexing; whereas flow grooming aims to collect data flows to use specific physical layer "pipe". In an Ethernet over SONET system, the transport flows are realized by SONET/SDH transport channels as Virtual concatenation groups (VCG) or contiguous concatenation groups that are running encapsulation protocols like GFP or X.86. The client flows are delivered as Ethernet frames over Ethernet ports/media.

To overcome the weakness of the current L1 and L2/3 EOS systems, the present invention provides a new EOS system architecture that accomplishes efficient use of transport BW and efficiently forward the resulting data stream(s) to directly to the transport connection without the drawbacks of a full-up L2/L3 layered network. The present invention accomplishes the following:

a. Aggregation: Capable of multiplexing a number of clients flows over a common transport connection (VCG).
b. Grooming: Capable of multiplexing client flows delivered over distinct transport connects (VCGs) over a common physical client interface (Ethernet port).
c. Flow Separation: Maintains traffic separation of client flows.
d. Flow QoS guarantee: Capable of ensuring the QoS characteristics of client flows.
e. Interoperability: The grooming/aggregation nodes are able to inter-operate with L1 EOS connections.
f. Scalability: The method is suitable for network deployment with large numbers end points, transport connections, and client flows.
g. Simplicity: Delivers the functionality in this list without the use of complex L2 and L3 bridging/routing protocols. The service provider equipment does not participate in bridging or routing domain of the client private network.

In accordance with a first aspect, the present invention provides a method of packet grooming and aggregation within an Ethernet over SONET/SDH system (EOS system), said method comprising: delivering efficient bandwidth per data stream; and mapping each said data stream directly to a physical transport interface independent of any Layer 2 bridging or Layer 3 routing protocol.

In accordance with a second aspect, the present invention provides an Ethernet over SONET/SDH system (EOS system), said EOS system comprising: an Ethernet MAC subsystem for providing MAC and PHY layer functionality for a plurality of Ethernet ports; an Aggregation/Grooming Engine (AGE) for providing grooming and aggregation functionality of said EOS system including label lookup, flow buffering, label editing, and flow scheduling; an Encapsulation Engine for providing adaptation between Ethernet frames and related SONET/SDH byte streams using adaptation protocols; a SONET/SDH Virtual Concatenation processor for providing byte stream transport pipes of flexible bandwidth via concatenating a number of SONET/SDH time slots; and a SONET/SDH protocol processor for providing overhead processing; wherein said AGE maps client flows with quality of service assurance between said plurality of Ethernet ports and corresponding SONET/SDH Virtual Concatenation Groups.

In accordance with a third aspect, the present invention provides an Ethernet over SONET/SDH system (EOS system), said AGE comprising: an ingress portion having an ingress header unit for receiving data from an Ethernet MAC subsystem; an ingress lookup engine including a corresponding ingress flow database and coupled to said ingress header unit; an ingress tag editor coupled to said ingress lookup engine; and an ingress flow FIFO unit coupled to said ingress tag editor and an encapsulation engine; and an egress portion having an egress header unit for receiving data from said encapsulation engine; an egress lookup engine including a corresponding egress flow database and coupled to said egress header unit; an egress tag editor coupled to said egress lookup engine; and an egress flow FIFO unit coupled to said egress tag editor and said Ethernet MAC subsystem; wherein said ingress portion and said egress portion of said AGE provide grooming and aggregation functionality for said EOS system including label lookup, flow buffering, label editing, and flow scheduling.

In accordance with a fourth aspect, the present invention provides a method of packet grooming and aggregation within an Ethernet over SONET/SDH system (EOS system), said method comprising: receiving a data packet; providing an input client frame from said data packet to a header unit; extracting a search key from said input client frame via said header unit; correlating said search key via a lookup engine to a match in a flow database to determine flow context; modifying said input client frame via a tag editor according to said flow context; buffering said input client frame via a flow FIFO; applying appropriate discard policies to said flow FIFO; and scheduling said input client frame via a scheduler of the flow FIFO for transmission into output channels according to output channel status and flow quality of service parameters.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention includes an Ethernet over SONET mapping device with aggregation and grooming capabilities. According to one aspect of the present invention, the EOS system includes an Ethernet MAC subsystem, the Aggregation/Grooming Engine (AGE), the Encapsulation Engine, SONET/SDH Virtual Concatenation processor, and SONET protocol processor.

Figure 1:
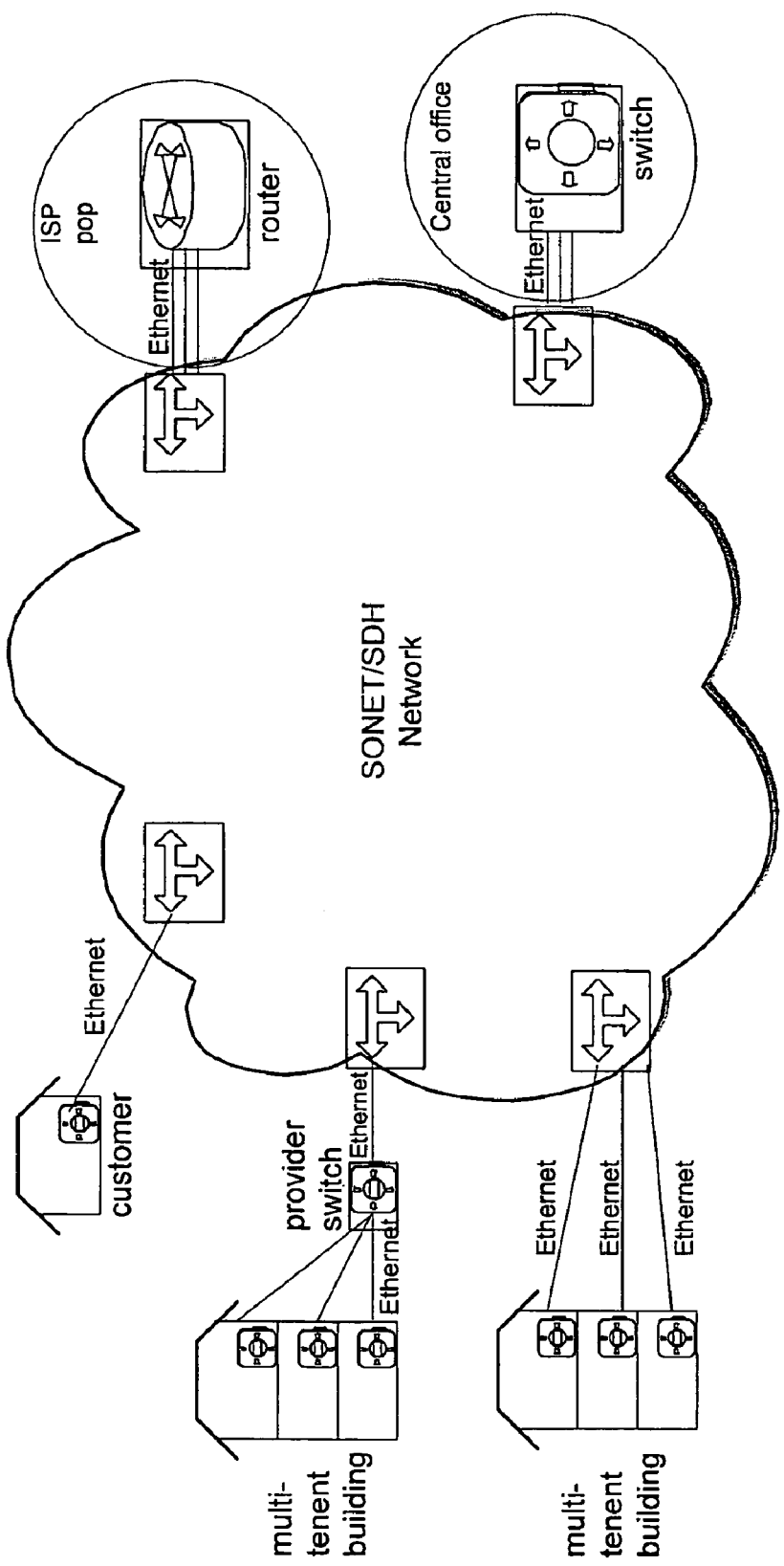
FIG. 1 is an illustration of Ethernet over SONET in accordance with the prior art.
Figure 2:
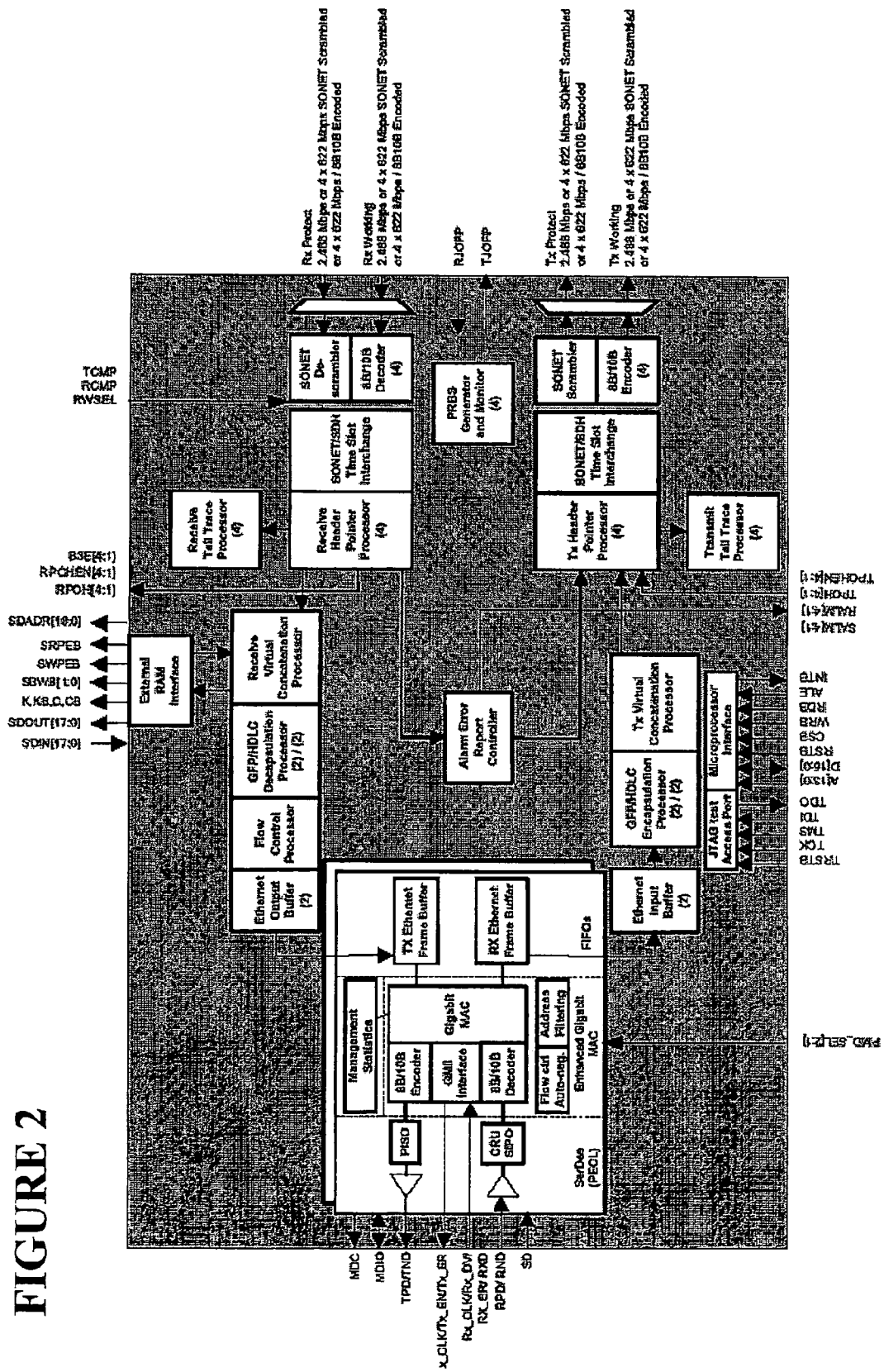
FIG. 2 is an L1 Ethernet over SONET/SDH Transport System Block Diagram in accordance with the prior art.
Figure 3:
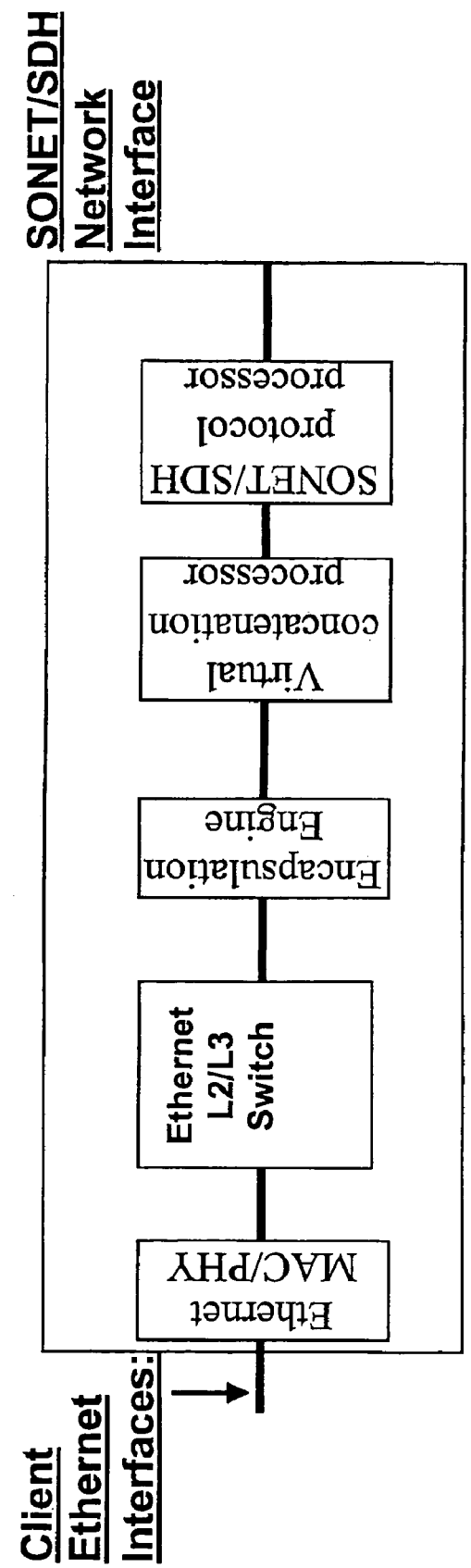
FIG. 3 is an L2/L3 Ethernet over SONET/SDH Switch System Block Diagram in accordance with the prior art.
Figure 4:
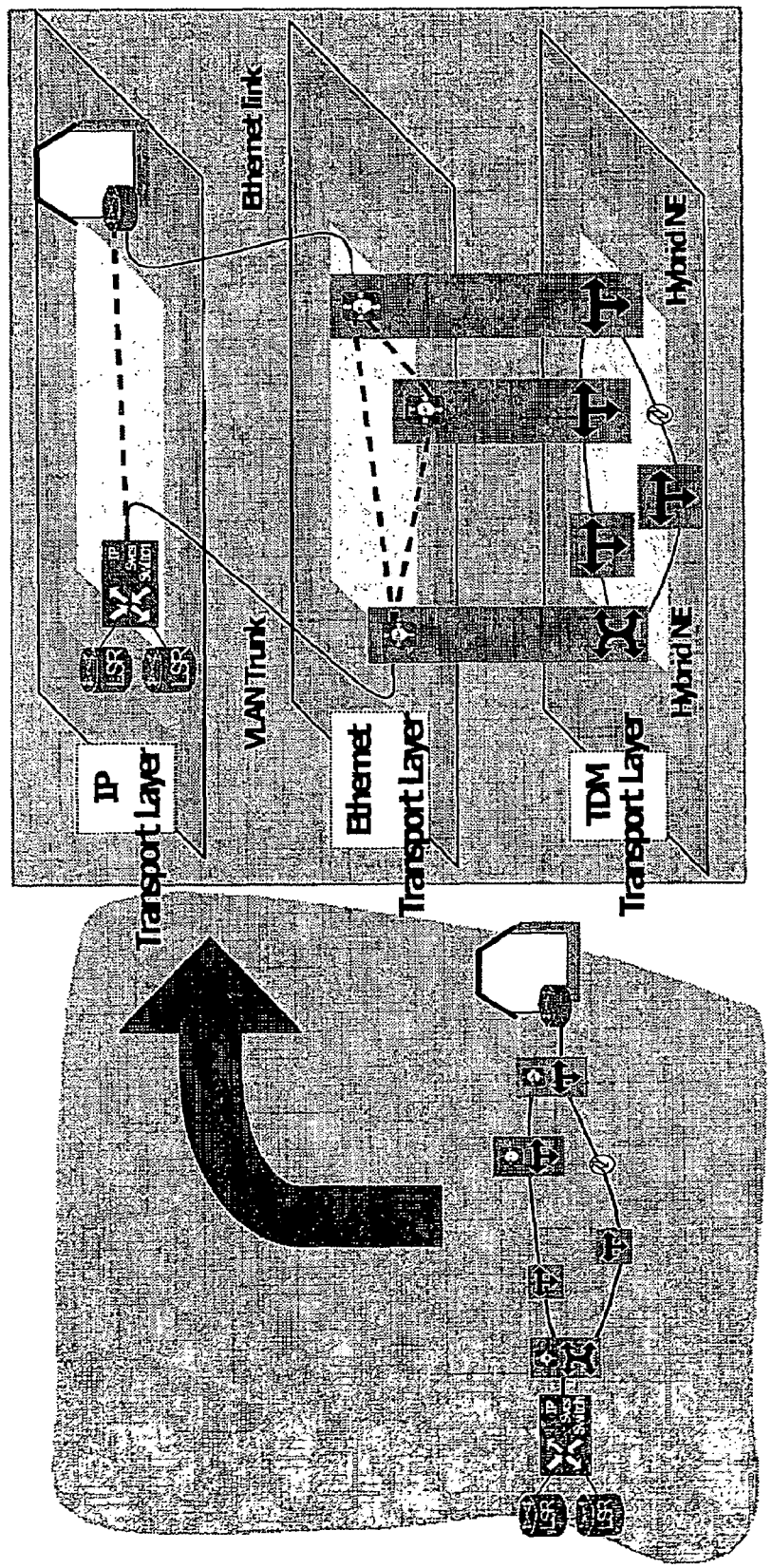
FIG. 4 is an Overlay Network based on L2/L3 EOS systems in accordance with the prior art.
Figure 5:
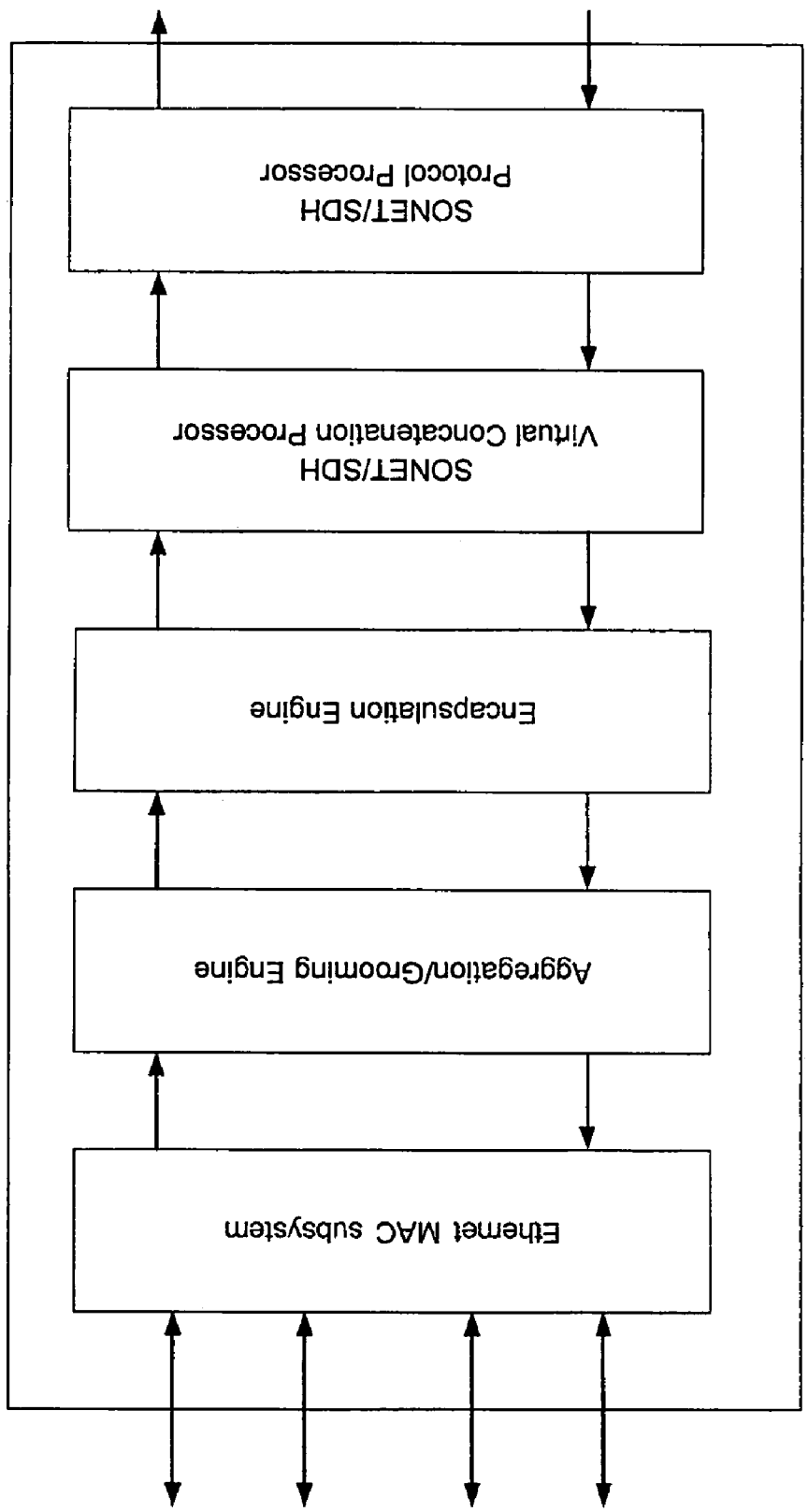
FIG. 5 is a block diagram of the EOS aggregation/grooming system in accordance with the present invention.

FIG. 5 shows a block diagram of the EOS aggregation/grooming system of the present invention. The Ethernet MAC subsystem contains the Ethernet MAC and PHY layer function as defined in the IEEE 802.3 standard for a number of Ethernet ports. Various types of media (coaxial cable, twisted pair cable, or optical fiber) and the speeds of the port (10 Mbps, 100 Mbps, 1 G bps, or 10 Gbps) can be supported by the Ethernet MAC subsystem. The basic MAC functions include:

a. Verifies frame integrity (i.e., FCS and length checks).
b. Error frames can be filtered or passed to higher layer device.
c. Auto-Negotiation.
d. Egress Ethernet frame encapsulation (pad to min size, add preamble, IFG and CRC generation).
e. Supports Ethernet 2.0, IEEE 802.3 LLC and IEEE 802.3 SNAP/LLC encoding formats including VLAN formats.
f. Supports IEEE 802.3-2000 flow control at each Ethernet port (per-port enabled).
g. Programmable per-channel watermarks for almost-full/almost-empty ingress FIFO thresholds.
h. Automatic generation of pause frames based on ingress FIFO fill levels.
i. Provides per port statistic counters that are needed to support the standard 802.3-2000, SNMP, and RMON Management Information Base (MIB) implementations.

The Aggregation/Grooming Engine (AGE) provides the grooming and aggregation function of the system. The AGE is responsible for label lookup, flow buffering, label editing, and flow scheduling. The detail of AGE will be described later hereinbelow.

The Encapsulation Engine deals with the adaptation between Ethernet frames and SONET/SDH byte stream using adaptation protocols such as GFP, X.86, or PPP. At the ingress direction (from Ethernet to SONET/SDH), the Encapsulation Engine takes variable length Ethernet frames, and encapsulates the frame into GFP, X.86, PPP, or HDLC framing format. By adding the HEC (header checksum) or HDLC escape sequence, the framing structure allows the remote end to delineate the frames when the byte stream is received. At the egress direction (from SONET/SDH to Ethernet), the Encapsulation Engine takes the byte streams received from the SONET/SDH transport pipe and recovers the Ethernet frames using the defined framing procedures. The Encapsulation Engine also deals with the control signalling protocols for set-up, tear-down, and maintenance of the connection and for communication of control information between the two ends of the connection.

The SONET/SDH Virtual Concatenation Engine (VC Engine) provides byte stream transport pipes of flexible bandwidth via concatenating a number of SONET/SDH time slots. Virtual Concatenation deals with concatenation both at the STS/STM level (High Order) and the Virtual Tributary Level (Low Order). The High Order Virtual Concatenation mapping and Low Order Virtual Concatenation mapping provides virtual concatenation function at different bandwidth granularities. The Virtual Concatenation Engine also deals with contiguous concatenation groups that are defined in the SONET/SDH hierarchy. At the transmit direction, the VC engine maps the byte stream from the Encapsulation Engine into the assigned time slots that belong to the Virtual Concatenation Group (VCG) in a round robin fashion as specified in the Virtual concatenation standard. The proper overhead byte values are inserted to the time slots to identify the membership index, and the sequence numbers to allow for the remote end to achieve the delay alignment of the byte stream. As the different time slots of the VCG may traverse different paths over the SONET/SDH transport network, the propagation delay on each time slot differs. At the receiver end, the VC Engine takes data input from the time slots that belong to the VCG, and align the byte streams from different time slot for differential delay compensation according to the VCG membership information and the sequence number carried in the SONET/SDH overhead bytes. The aligned byte streams are then merged into a single logical stream of data that is presented to the Encapsulation Engine.

Often, the VC engine also implements the LCAS as a control protocol for VCG set-up/tear-down and for dynamic adjustment of the size of each VCG. This allows TDM services to provide more flexibility for handling dynamic bandwidth demands. LCAS relies on the network NMS/EMS to provision the bandwidth change. LCAS protocol coordinates the operations of the two end points of the Virtual concatenation group to ensure that the channel size adjustment is hitless.

The SONET/SDH protocol processor implements the overhead processing that is typically found in a SONET/SDH framer. It also provides interfaces to either the SONET/SDH network directly, or functions to Interface with the rest of the SONET/SDH MSPP system (such as interface to the TDM switch fabric of the MSPP) that is part of the SONET/SDH network.

The Aggregation/Grooming Engine (AGE) provides the mapping of client flows with QoS assurance between the Ethernet ports and the SONET/SDH Virtual Concatenation Groups (VCG). As shown in the Aggregation/Grooming Data Flow of FIG. 6, at the ingress direction the AGE takes traffic aggregate from the Ethernet ports consisting of one or multiple client flows, grooming each flow according to flow tag of certain format, and aggregate these flows into the specified SONET/SDH VCGs according to the QoS configuration. On the egress direction, the traffic aggregates from the VCGs are groomed first into client flows, and then aggregate into the Ethernet ports.

Figure 6:
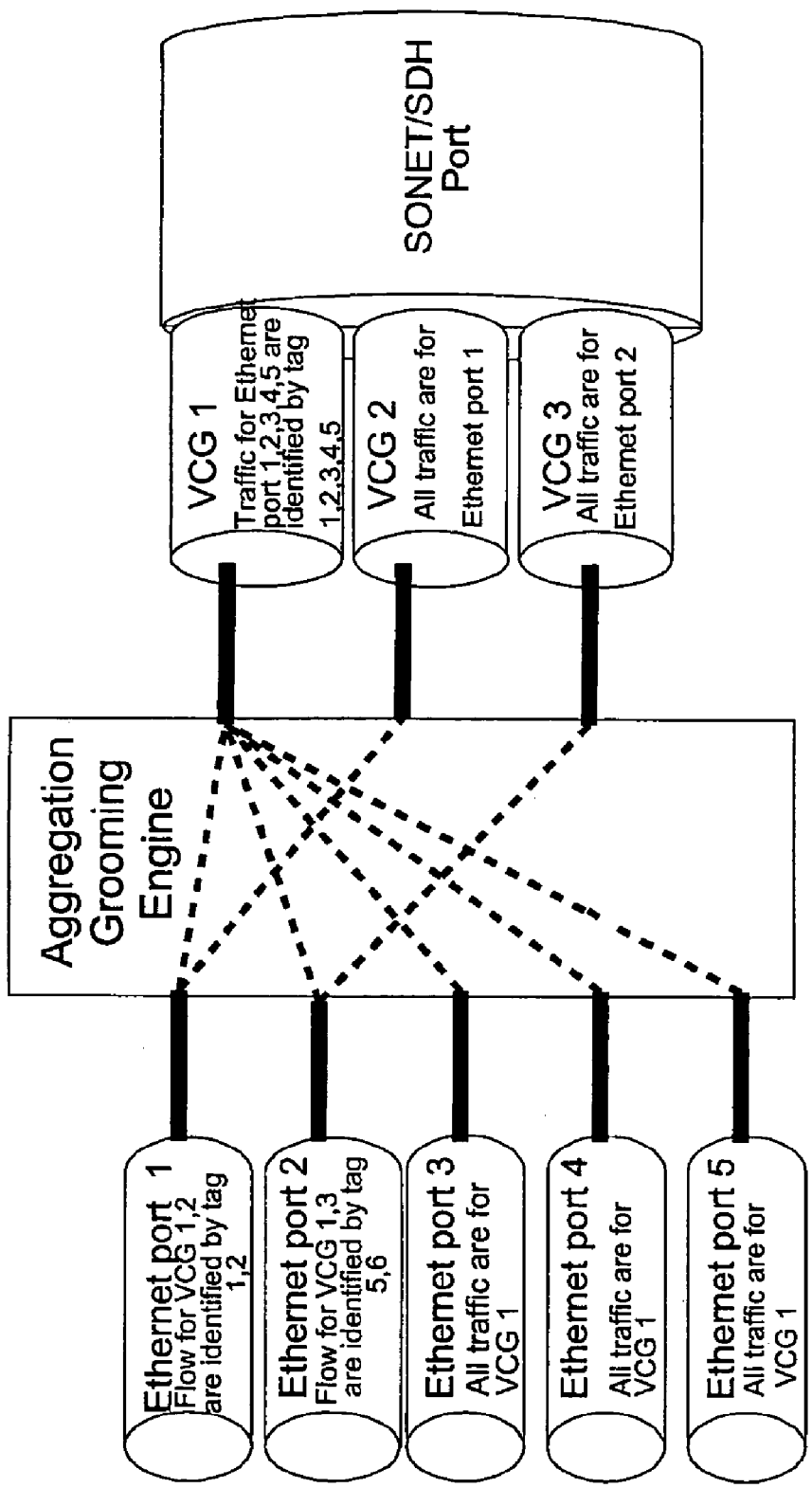
FIG. 6 is a diagram showing Aggregation/Grooming Data Flow in accordance with the present invention.

With further reference to FIG. 6, the traffic aggregate from/to the VCG and Ethernet ports are represented by solid lines, the client flows are represented by dotted lines. For instance, the traffic from Ethernet port 1 contains two multiplexed client packet flows identified by tag value 1 and 2 respectively. The flow 1 is to be mapped into SONET/SDH VCG1 after aggregation with many client flows from Ethernet port 2, 3, 4, and 5. The client flow 2 from Ethernet port 1 is mapped into SONET/SDH VCG 2 that is dedicated to carry this single flow. As another example, at the egress direction, the traffic from VCG 1 consists of 5 multiplexed packet flows identified by tag 1,2,3,4 and 5.

These flows are groomed and buffered separately and then sent to the appropriate Ethernet ports after merging with client flows that share the same Ethernet ports. For Ethernet port 1, the client flow 1 from VCG1 and the flow from VCG2 are merged (aggregated).

Figure 7:
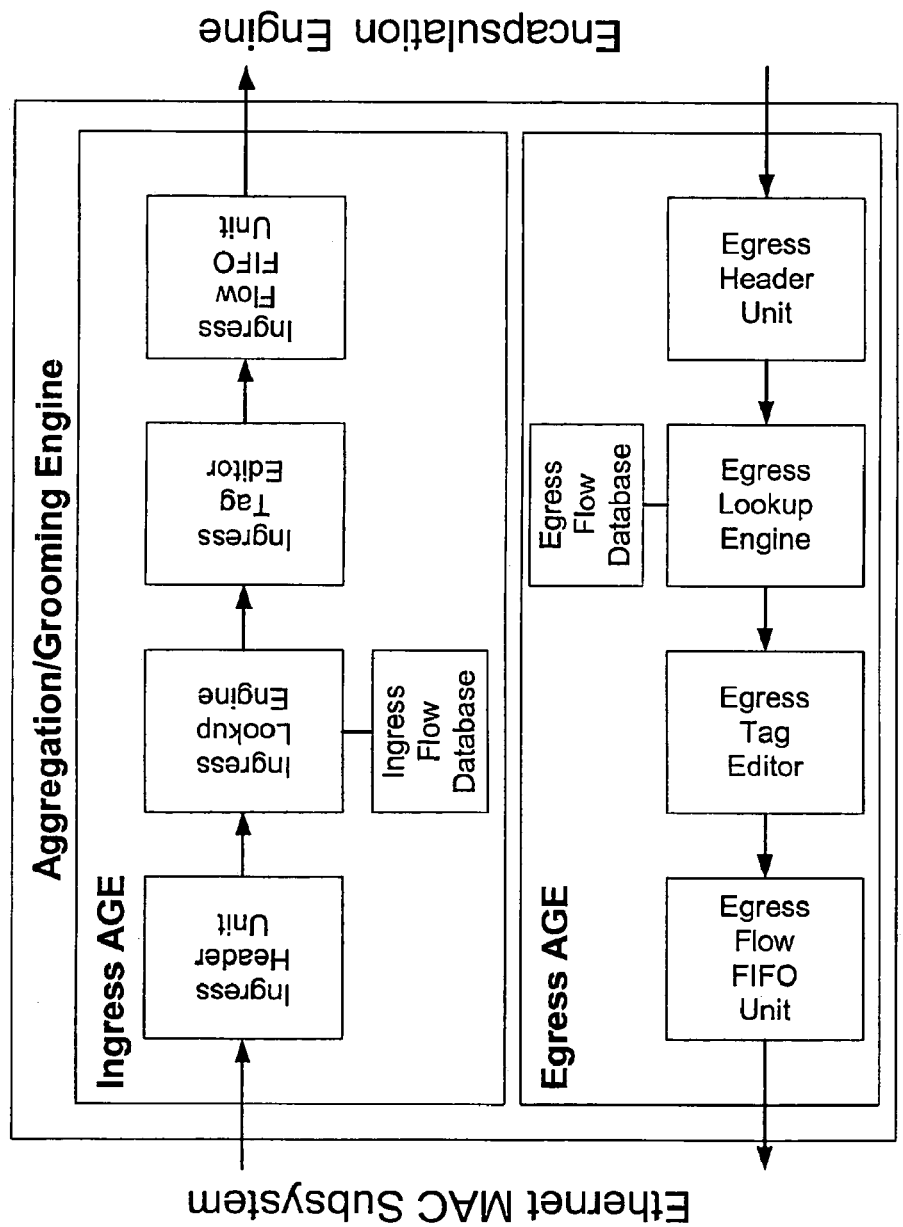
FIG. 7 is a block diagram of the AGE based on Unidirectional Lookup Engines in accordance with the present invention.

One embodiment of the Aggregation/Grooming Engine structure (based on unidirectional Lookup Engines) is shown in FIG. 7. The Aggregation/Grooming Engine is divided into two symmetrical subsystems: Ingress AGE and Egress AGE. The Ingress AGE has the same structure as the Egress AGE, but may differ slightly in regard to the tag and frame format related to the Header Unit and the Tag editor. It should be noted that the Ingress AGE and Egress AGE may either use two separate designs, or use variations of the same design that supports the frame and tag format of both the ingress and egress.

Figure 8:
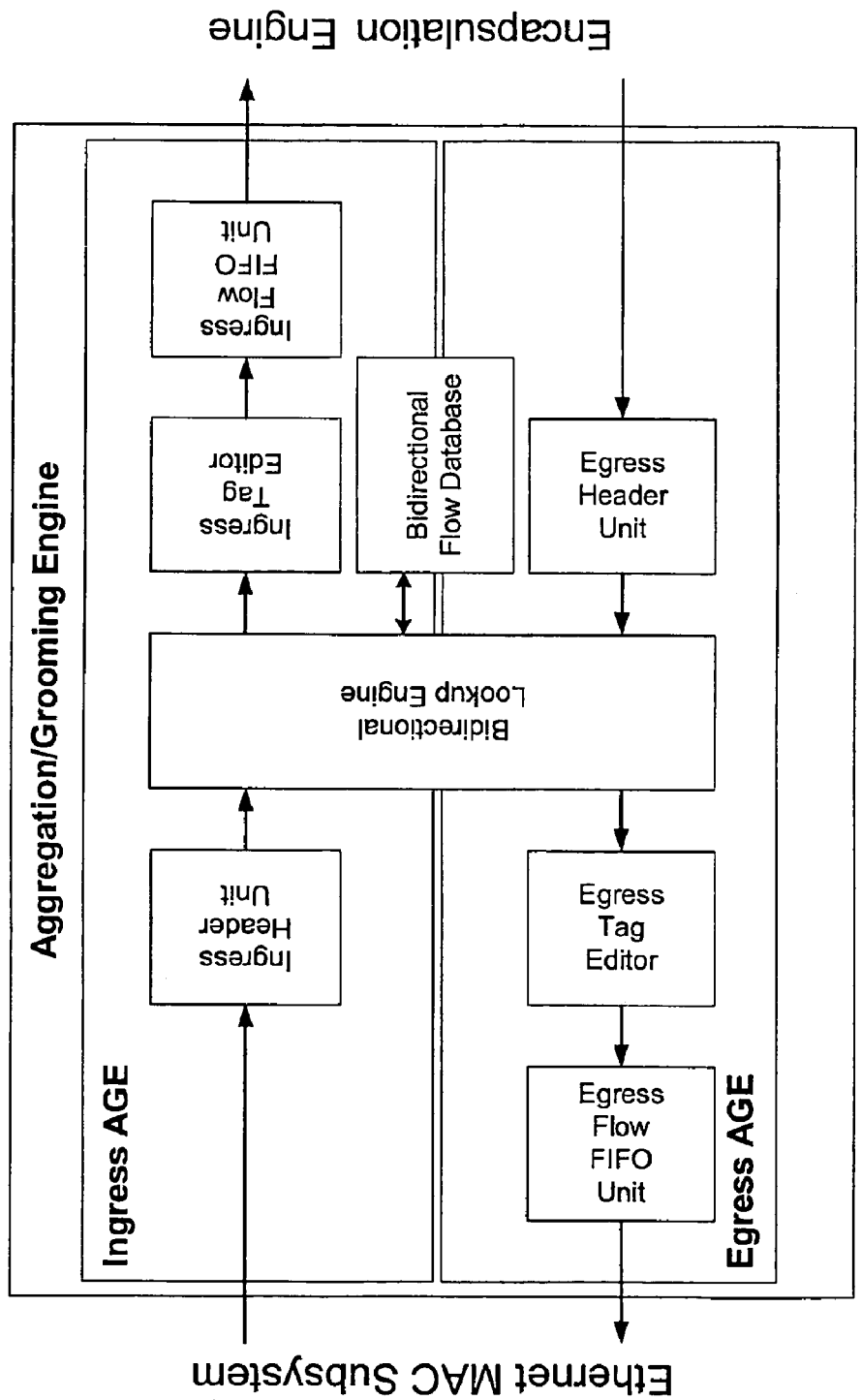
FIG. 8 is a block diagram of the AGE based on Bi-directional Lookup Engine in accordance with the present invention.

An alternative embodiment of the AGE based on a Bi-directional Lookup Engine is shown in FIG. 8. The only difference with the first AGE embodiment is in the Lookup Engine. In FIG. 8, the Ingress AGE and Egress AGE shares a common Bi-directional Lookup Engine and a common Flow Database.

Figure 9:
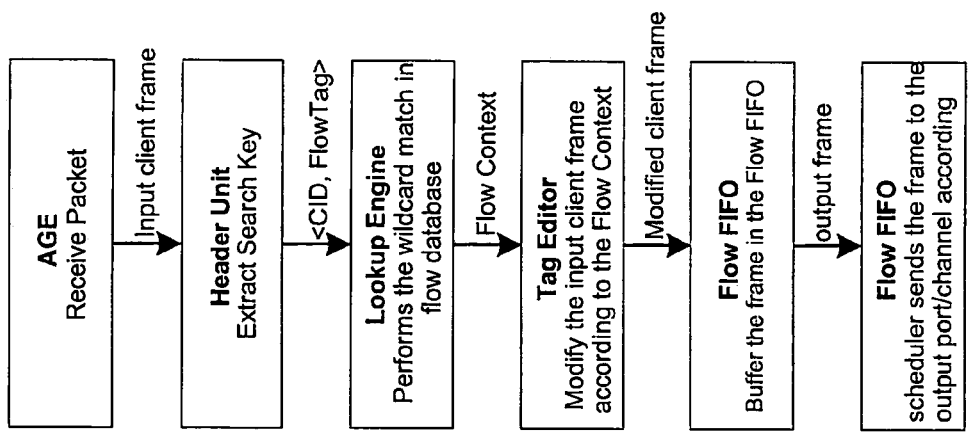
FIG. 9 is an Aggregation/Grooming Flow Chart in accordance with the present invention.

FIG. 9 illustrates the processing flow of the client frame through the AGE subsystem blocks. First, a received packet is processed by the Header Unit. The Header Unit extracts the two-tuple search key from the client frame according to the frame format configuration of the input channel. The search key is then passed on to the Lookup Engine. The Lookup Engine performs a wildcard linear search of the key in the flow database. The output of the Lookup Engine is a multi-field flow context. The flow context is then used by the Tag Editor to perform tag modification on the original client frame. The modified frame is then buffered in the Flow FIFO according to the flow context. The scheduler of the Flow FIFO decides when to transmit packets into the output channels from which FIFO according to the output channel status and the Flow QoS parameters.

The Ingress/Egress Header Units will now be described. The AGE can support a number of different tag formats for flow identification. Different types of tags are supported at the Ethernet and the SONET/SDH side as shown in TABLE 1 and TABLE 2 below. TABLE 1 details tag format on the Ethernet interface. The extracted flow tag is combined with the Ethernet Channel (Port ID), or the SONET/SDH channel (or VCG) ID. It should be understood that while SONET VCG is discussed herein, all suitable SONET structures including, but not limited to, synchronous transport signals (e.g., STS-3) channels STS may be used within the scope of the present invention.

TABLE 1

| Flow Tag Format | Details |
| --- | --- |
| 802.1Q tag | Support both Ethernet V2.0 and Ethernet 802.3 frame format. The flow identifier can be the only 802.1Q tag, or is the out-most tag in VLAN stacked frame with multiple 802.1Q tags. The inner 802.1Q tags are regarded part of the client payload. |
| MPLS tag | Support both Ethernet V2.0 and Ethernet 802.3 frame formats with or without 802.1Q tag. |
| Proprietary Tag | Support both Ethernet V2.0 and Ethernet 802.3 frame formats with or without 802.1Q tag. The Proprietary tag may be defined in fixed offset location of the frame payload. |

TABLE 2 details tag format on the Ethernet interface.

TABLE 2

| Flow Tag Format | Details |
| --- | --- |
| 802.1Q tag | Support both Ethernet V2.0 and Ethernet 802.3 frame format. The flow identifier can be the only 802.IQ tag, or is the out-most tag in VLAN stacked frame with multiple 802.IQ tags. The inner 802.IQ tags are regarded part of the client payload. |
| MPLS tag | Support both Ethernet V2.0 and Ethernet 802.3 frame formats with or without 802.IQ tag. |
| Proprietary Tag | Support both Ethernet V2.0 and Ethernet 802.3 frame formats with or without 802.IQ tag. The Proprietary tag may be defined in fixed offset location of the frame payload. Can also be proprietary Tag in the HDLC |
| GFP Tag | Can be the GFP CID (Channel ID) or other Flow Ids defined in the GFP linear extension header. |

The Ingress Header Unit and the Egress Header Unit parse the receive frames according to the frame format defined in TABLE 1 and TABLE 2 to locate and extract the flow tag from the frames. The detailed specification of the various frame formats and the offset location of the relevant tag is defined in the 802.1Q, 802.3, GFP, and X.86 standards and are well understood by one skilled in the art. The Header Units follows the conventions defined in these standards for packet format parsing. In one embodiment of the present invention, the format recognized by each channel (Ethernet Port or SONET/VCG) can be configured separately. The header units employ different parsing state-machine for different ports accordingly.

The extracted flow tag is combined with the Ethernet Channel (Port) ID, or the SONET/SDH VCG channel ID to form a search key of two-tuple <CID, FlowTag>. For the Ingress Header Unit, the CID field represents from which Ethernet port the packet is received, the FlowTag represents the flow tag extracted from the received packet. For the Egress Header Unit, the CID represents from which Virtual Concatenation Group the packet is received, and the FlowTag represents the flow tag extracted from the received packet according to the channel tag format configuration.

The Ingress/Egress Lookup Engine will now be described involving one embodiment as a Unidirectional Lookup Engine. In such embodiment of the invention, the ASE uses separate Ingress and Egress Lookup Engine as shown in FIG. 7. The Ingress Lookup Engine and Egress Lookup Engine are two variations of the same design. The lookup procedures and the format of flow databases are the same between the Ingress Lookup Engine and Egress Lookup Engine, but the source of the lookup key and the content of the flow databases are different.

Figure 10:
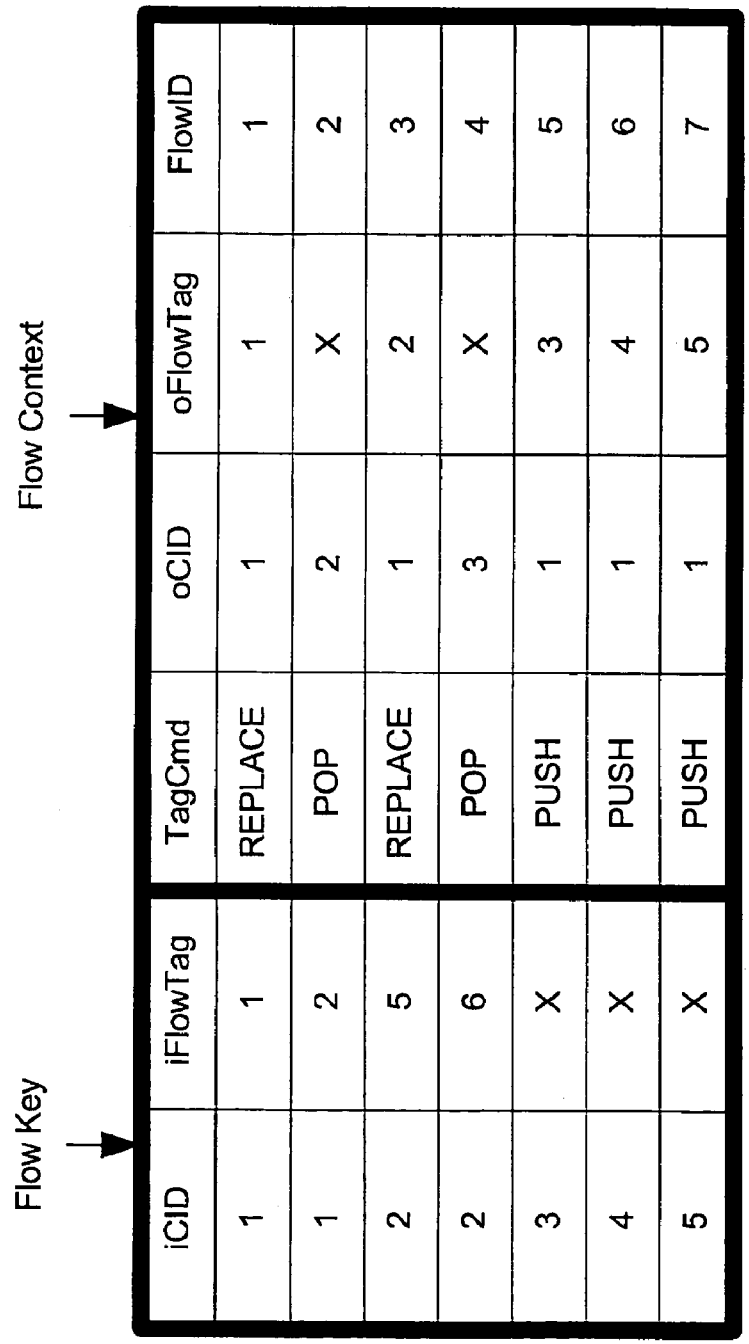
FIG. 10 shows an AGE Ingress Flow Database in accordance with the present invention.

As an example, the ASE Ingress lookup database shown in FIG. 10 is arranged to represent the flow definitions shown in FIG. 6. The database is a two dimensional linear table. Each row of the table represents the definition of a client flow. Each column of the table represents a parameter field associated with the flow. The parameter fields are:
 a. iCID: Input Channel ID, represents which input channel the frame is received from. It is used to match against the iCID field of the two-tuple search key.
 b. iFlowTag: Input Flow Tag, represents the tag value that identifies the client flow. It is used to match against the iFlowTag field of the two-tuple search key. The iFlowTag can be either an exact value, a wildcard value that represents a range.
 c. oCID: Output Channel ID, represents which output channel the flow should be sent towards.
 d. oFlowTag: Output Flow Tag, represents the tag value to be added to the outgoing frame, to be used as an operand in the packet editing operation.
 e. TagCmd: Tag Editing Command, represents the tag operation to be done on the frame. Possible values are: POP (remove iFlowTag), NOP (keep Tag), PUSH (Add oFlowTag), REPLACE (iFlowTag with oFlowTag).

The <iCID, iFlowID> belongs to the Flow Key Fields of the database. The <TagCmd, oCID, oFlowTag, FlowID> constitutes the Flow Context Fields determines the operations on the client frame in the Tag Editor and FlowFIFO subsystems of the AGE.

Figure 11:
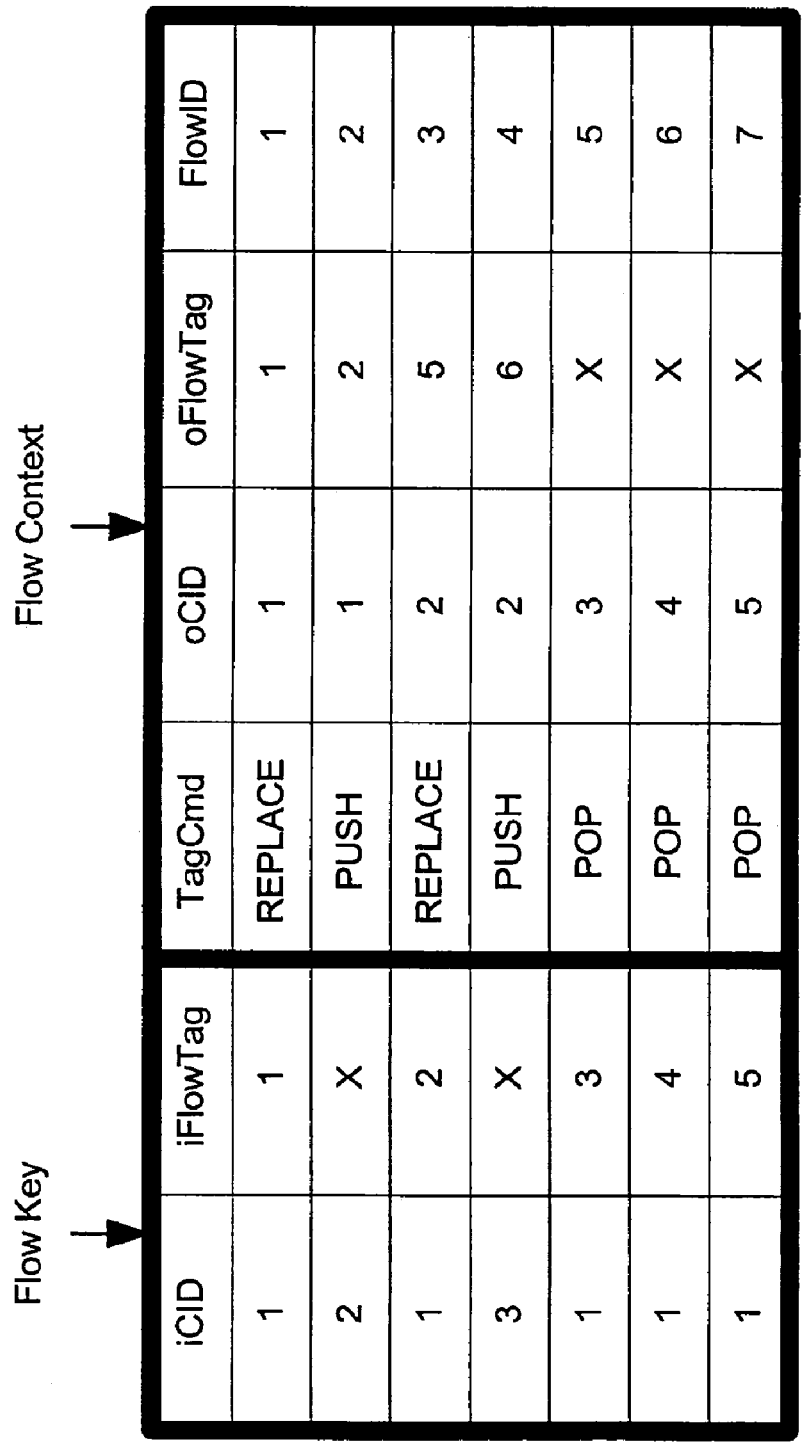
FIG. 11 shows an AGE Egress Flow Database in accordance with the present invention.

The Egress Lookup Engine uses the same database format to represent the egress client flows and the required operations for mapping the flows from the VCGs to the Ethernet ports. FIG. 11 shows the flow definition in terms of an AGE Egress Flow Database for the example of FIG. 6.

Figure 12:
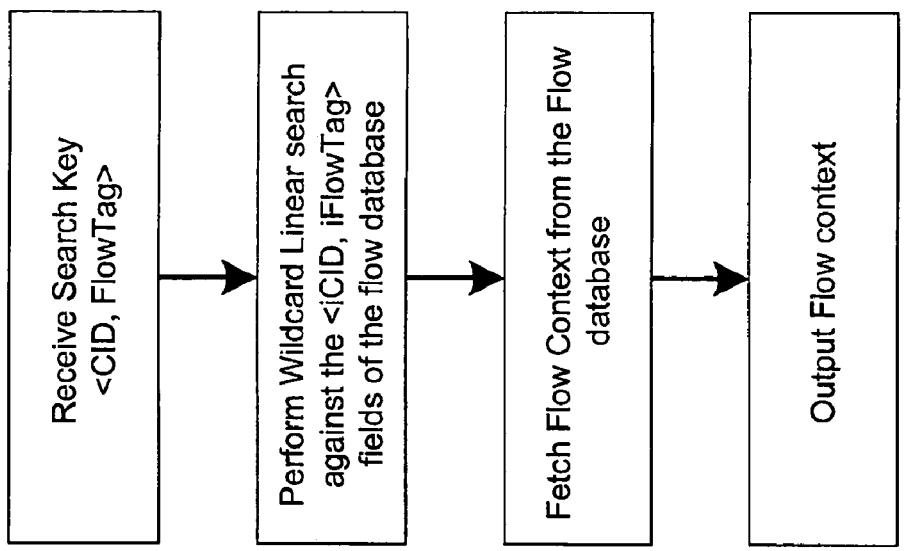
FIG. 12 shows a Unidirectional Lookup Flow Chart in accordance with the present invention.

The Unidirectional Lookup Engine uses the lookup key two-tuple <CID, FlowTag> generated by the Ingress Header Unit to perform the lookup function. The lookup is a wildcard linear match against the <iCID, iFlowTag> fields of the lookup database. There are a number of ways of implementing linear search that will be further discussed later in this document. The procedure of Unidirectional Lookup Engine is shown in FIG. 12 as a Unidirectional Lookup flow chart. The Unidirectional Lookup Engine first receives the lookup key from the AGE Header Unit. The search key is the used to perform the wildcard linear search against the key fields of the flow database. After a match is found, the flow context fields of the corresponding entry of the database are fetched as the lookup result. Finally the lookup result is sent to the AGE Tag Editor. Note that the flow database contains a default entry of <X, X> that would match any search key to ensure the lookup procedure can always find a match. The flow context for the default entry defines how the default frames should be processed (discarded, or sent to a default channel).

The Ingress/Egress Lookup Engine will now be described involving another embodiment as a Bi-directional Lookup Engine. The Unidirectional Lookup Engines are suitable for applications where the client flows are unidirectional flows. For bi-directional flows as given in the example of FIG. 6, there is a more efficient way of implementing the Ingress/Egress Lookup Engine. By comparing the Ingress Flow Database in FIG. 10 and FIG. 11, it is apparent that the <iCID, iFlowID> fields of the Ingress Flow Database is the same as the <oCID, oFlowID> fields of the Egress Flow Database; the <oCID, oFlowID> fields of the Ingress Database is also the same as the <iCID, oFlowID> fields of the Egress Database. The <TagCmd> field of the Ingress Flow Database can also be one-to-one mapped to the <TagCmd> field of the Egress Flow Database. The mapping relationship between the Ingress TagCmd and the Egress TagCmd field value is summarized in TABLE 3 below.

TABLE 3

| Ingress TagCmd | Egress TagCmd |
|---|---|
| PUSH | POP |
| NOP | NOP |
| REPLACE | REPLACE |
| POP | PUSH |

Based on the relationship between Ingress and Egress Flow database, the Bi-directional Lookup Engine combines the function of Ingress and Egress Lookup Engine into a single Entity. The Ingress Flow database and Egress Flow database are also merged into a single Bi-directional Flow Database. The structure of the AGE based on Bi-directional Lookup Engine is as shown in FIG. 8. The format of the shared Bi-directional Flow Database is the same as the Ingress Flow Database shown in FIG. 10.

Figure 13:
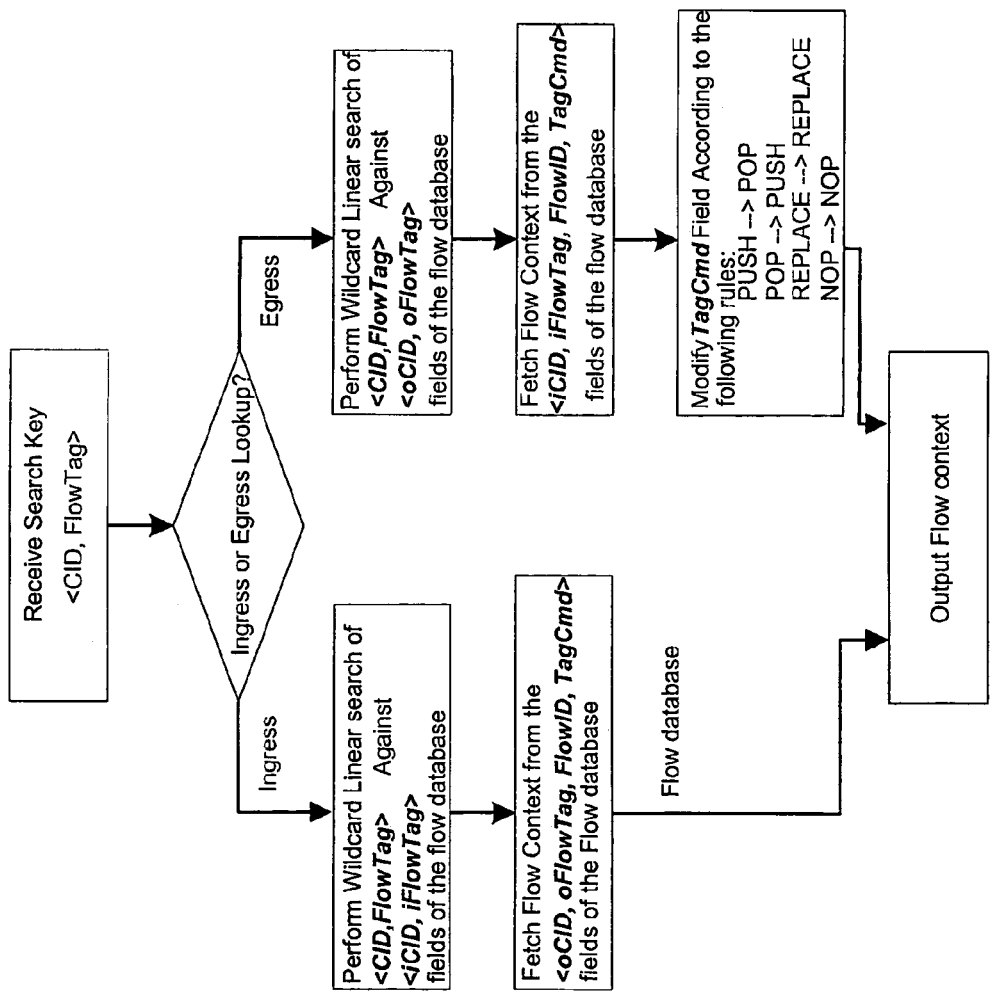
FIG. 13 shows a bi-directional Lookup Flow Chart in accordance with the present invention.

The processing procedure of the Bi-directional Lookup is shown in FIG. 13 as a Bi-directional Lookup flow chart. Depending on if a lookup is for Ingress AGE or Egress AGE. In the case of ingress lookup, the linear search is essentially the same as the flow of unidirectional lookup engine. The search key <CID, FlowTag> is matched against the <iCID, iFlowTag> fields of the Flow Database. Thereafter, the result is of the lookup is fetched from <oCID, oFlowTag, FlowID, TagCmd> fields of the matching entry of the Flow Database. For egress lookup, the search key <CID, FlowTag> is matched against the <oCID, oFlowTag> fields of the Flow Database. The lookup result is fetched from <iCID, iFlowTag, FlowID, TagCmd> fields of the matching entry of the Flow Database. Also, the TagCmd is mapped according to TABLE 3 to generate the final flow context output.

The key benefit of using Bi-directional Lookup Engine is the reduced memory size required for storing the Flow databases by sharing the data structure between Ingress and Egress AGE. This improvement can result in substantial cost savings if the flow database is stored with on-chip memory provided the memory can provide sufficient access bandwidth for the bi-directional lookups.

Both the Unidirectional Lookup Engine and Bi-directional Lookup Engine described above requires the function of Wildcard Linear Search. The various search methods used include:

a. Sequential Linear Match: the lookup Engine loops through every entry of the flow database. For each entry, the search key is compared against the key fields of the entry to determine if the current entry is a match. If a match is found, the loop is terminated and the Flow context field of the current entry is the lookup result.

b. Parallel Associative Match using Content Addressable Memory (CAM, a.k.a. Associative Memory). To do the wildcard matching function required by this invention, Ternary Content Addressable Memory (TCAM) is required. The TCAM is used to store the key fields of the flow database, and regular Random Access Memory (RAM) is used to store the Flow Context fields of the database. The TCAM can do parallel match of the search key on all the entries of the key fields, and returns the index of the matching entry of TCAM as the result of TCAM access. The index is then used to fetch the corresponding flow context fields of the matching entry from the RAM.

c. Parallel Associative Matching Technique as described in "Multi-Field Classification Using Enhanced Masked Matching" filed as U.S. patent application Ser. No. 09/908,917 and herein incorporated by reference. This technique can be used to implement the associative search function required in the AGE Lookup Engine designs.

d. Parallel Associative Matching Technique described in "Improved Efficiency Masked Matching" filed as U.S. patent application Ser. No. 09/953,215 and herein incorporated by reference. This technique can be used to implement the associative search function required in the AGE Lookup Engine.

The Function the Ingress Tag Editor and the Egress Tag Editor are the same except the process traffic flows on opposite directions. The Tag Editor interprets the Tag Editing Command as represented by TagCmd in the Flow context that is generated by the Lookup Engine and does client frame modification according to the commands and the value of oFlowTag. The legal frame editing commands are listed in TABLE 4 below.

TABLE 4

| TagCmd | Operations |
| --- | --- |
| PUSH | Add the oFlowTag to the client frame |
| NOP | Do not modify the client frame |
| REPLACE | Remove the iFlowTag from the client frame, and insert the oFlowTag to the client frame |
| POP | Remove the iFlowTag from the client frame |

Note that the editing commands may involves two steps: processing of the iFlowTag, and processing of the oFlowTag, as they may show up in different protocol layers as earlier described and shown in TABLE 1 and TABLE 2. Therefore, the tag editing must be done according to the header format configuration of the input channel and the output channel. For example, if a frame is received from an Ethernet port and to be sent to an SONET VCG, the iFlowTag is found in the 802.1Q tag of the received packet, and the SONET VCG requires the oFlowTag to be an MPLS Tag, for a REPLACE command, the Tag Editor need to remove the 802.1Q iFlowTag and then add the oFlowTag at the MPLS layer.

The Ingress/Egress FIFOs implements the client flow frame buffering and scheduling function. The function is of the Ingress Flow FIFO and Egress Flow FIFO is essentially the same except the service the traffic on opposite directions. The Flow FIFO is a multi-channel FIFO frame buffer. Each channel FIFO is logically a First-In-First-Out memory. Each client flow consumes one dedicated channel of the FIFO. At the input of the FIFO, the client frames are sent to the FIFO channel identified by FlowID in the flow context generated by the AGE Lookup Engine. The frame is stored in the FIFO memory according to the queuing discipline imposed on the FIFO.

Depending on the application, a leaky bucket traffic policer may be implemented for each flow to ensure the input flows fits the traffic profile according the Service Level Agreements. Additionally the following FIFO enqueuing rules may be implemented:

a. Tail Drop: When the FIFO fill level exceed the pre-configured threshold level, the received client frame discarded until the fill level goes below the threshold.

b. Backpressure: When the FIFO fill level exceed the pre-configured Backpressure-On Threshold, the FIFO will trigger an action to generate a flow control ON message to the source of the traffic to slow down the transmission of frames into the system. More frames can be added to the FIFO until the fill level exceeds Drop Threshold, then further received frames are discarded until the fill level goes below the Drop Threshold. If the fill level goes below the Backpressure-Off Threshold, then a flow control OFF message is triggered by this event to inform the traffic source that the system can accept more traffic.

c. WRED (Weighted Random Early Discard): WRED algorithm can be implemented on the FIFO to probabilistically discard frames according to the FIFO fill level.

The Flow FIFO output logic contains a multi-channel scheduler that is corresponding to the output channels (Ethernet ports, or VCGs) of the system. Each scheduler is configured to fetch frames from one or multiple flow FIFOs for transmission to the associated output port according to the flow aggregation requirement. For example, if Ethernet port 1 is required to aggregate traffic from flow 3, 7, and 5. Thereafter, the scheduler for Ethernet port 1 is configured to take frames from FIFO 3, 7, and 5. The schedulers makes scheduling decisions about when and which FIFO to fetch the next packet from for each output channel according to the output channel status, the FIFO fill level and the QoS parameters associated with each flow. The scheduler may implement one of the following scheduling disciplines: Round Robin, Weighted Round Robin, Deficit Round Robin, or other WFQ (Weighted Fair Queuing) techniques to address the Flow QoS requirements.

It should be readily understood that while the present invention has been described in terms of an Ethernet over SONET MSPP system with flow Aggregation and Grooming capabilities, the concept of AGE may also be applied to other networking applications beyond Ethernet over SONET where the client packet flow grooming and aggregation functions are needed. Moreover, the present invention may be realized in several physical implementations without straying from the intended scope of invention. Such implementations may include, without limitation, a single or multiple VLSI devices that achieves a subset or a superset of the functions described in this invention, integrated circuit techniques including FPGA and ASIC, and implementations where part or all of the functions described in this invention may be implemented in either software or hardware, or a combination of software and hardware.

In operation, the present invention results in an elegant, yet scalable method for constructing a client flow grooming and aggregation system for Ethernet over SONET and other applications. It provides-significant improvements over prior art systems including lower system complexity, lower system cost, less complex network model, increased network efficiency, and lower network deployment and maintenance costs.

It should be understood that the preferred embodiments mentioned here are merely illustrative of the present invention. Numerous variations in design and use of the present invention may be contemplated in view of the following claims without straying from the intended scope and field of the Invention herein disclosed.

Having thus described the invention, what is claimed as new and secured by Letters Patent is:

1. A method of packet grooming and aggregation within an Ethernet over SONET/SDH system (EOS system), said method comprising:
   receiving a data packet tagged according to an encapsulation scheme and including a tag and a port or channel ID;
   providing an input client frame from said data packet to a header unit;
   extracting a search key including said port or channel ID and said tag from said input client frame via said header unit;
   correlating said search key via a lookup engine to a match in a flow database to determine flow context;
   modifying said input frame via a tag editor according to said flow context;
   buffering said input client frame via a flow FIFO;
   applying discard policies to said flow FIFO based on said flow context; and
   scheduling said input client frame via a scheduler of the flow FIFO for transmission into output channels according to output channel status and flow quality of service parameters, wherein said correlating step occurs in accordance with a combined ingress table and egress table in a bi-directional lookup manner, and further including the steps of:
   receiving said search key,
   upon determining an ingress lookup,
   performing a first wildcard linear search of said search key against predetermined ingress flow fields of a bi-directional flow database,
   fetching flow context from said egress flow fields of said bi-directional flow database,
   upon determining an egress lookup,
   performing a second wildcard linear search of said search key against predetermined egress flow fields of a bi-directional flow database,
   fetching flow context from said egress flow fields of said bi-directional flow database,
   modifying a portion of said egress flow fields according to predetermined rules, and
   outputting said flow context.

2. The method of packet grooming and aggregation as claimed in claim 1 wherein said scheduling step occurs in accordance with said flow context.

3. The method of packet grooming and aggregation as claimed in claim 2 further including the steps of:
   receiving said search key,
   performing a wildcard linear search against predetermined search key fields of said flow database,
   fetching said flow context from said flow database, and
   outputting said flow context.

* * * * *